Nov. 12, 1963 M. PUSTELNYK 3,110,768

PULSE MODULATION REGENERATIVE REPEATER WITH SELECTIVELY SUPPRESSED TIMING WAVE

Filed June 14, 1960

INVENTOR
M. PUSTELNYK
BY [signature]
ATTORNEY

United States Patent Office 3,110,768
Patented Nov. 12, 1963

3,110,768
PULSE MODULATION REGENERATIVE REPEATER WITH SELECTIVELY SUPPRESSED TIMING WAVE

Mike Pustelnyk, Syracuse, N.Y., assignor to Bell Telephone Laboratories, Incorporated, New York, N.Y., a corporation of New York Filed June 14, 1960, Ser. No. 35,954
1 Claim. (Cl. 178—70)

Figure 1:
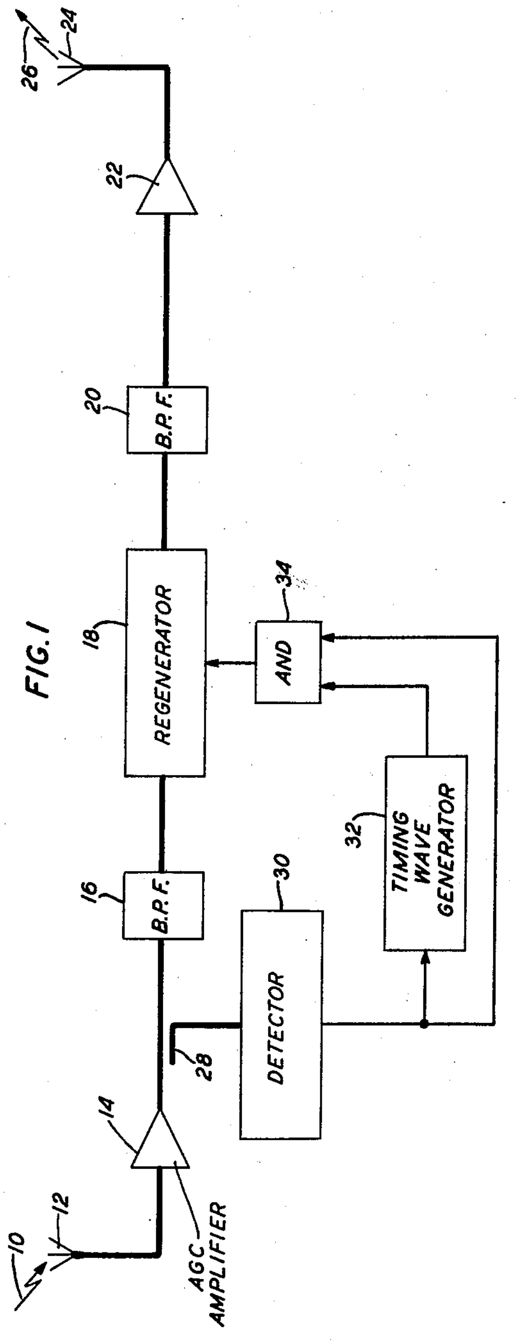

This invention relates to regenerative repeaters as employed in pulse modulation systems and, more particularly, to improvements in the properties of the pulse regenerators associated therewith.

Repeaters of the type contemplated herein include at least a regenerator for reconstructing degraded incoming information pulses under the control of clock or timing pulses to prepare them for retransmission. The properties of such regenerators are conveniently displayed by the expedient of a graph of output level plotted against input level. Three distinct regions generally characterize these graphs. In the region of low input level, the output level remains essentially at some constant predetermined level, usually zero, as the input level increases. As the input level increases beyond that of the first region, a second region is reached in which the output level varies with the input level; and finally, as the input level increases beyond that of the second region, a third region is reached in which, for increasing input level, the output level remains constant at some new predetermined level.

The function of regeneration is to reconstruct the incoming information pulses while suppressing the noise and spurious signals which have accreted to the information pulses during transmission. With this in mind, a regenerator, then, should produce output pulses of some predetermined level and shape from input pulses that are greatly distorted and degraded. Likewise, between pulses the regenerator output should continually remain at some lower constant level, usually zero.

If the varying region of the graph of the regenerator properties is large there is a large range of input levels for which the output varies with the input, and hence for which the regeneration is defective. It is evident from this that a favorable property of regenerators is a small varying region, making possible the production of well-shaped information signals and the simultaneous suppression of most of the accreted noise and spurious signals accompanying the incoming information signals.

It may be desired to transmit radio frequency pulse information, in which case the regenerators employed in the repeaters are required to operate upon radio frequency pulses. Because of the high frequencies involved and various other difficulties encountered in regenerating radio frequency pulses, it is especially arduous to achieve favorable properties, particularly with regard to the aforementioned varying region, in radio frequency pulse regenerators.

It is, therefore, the object of the present invention to improve the properties of radio frequency pulse regenerators, and particularly to reduce the extent of the region of varying response thereof.

In accordance with the invention, therefore, there is provided in a regenerative repeater for radio frequency pulse information signals a signal path which includes, in order, an input circuit for incoming radio frequency pulse information signals, means for abstracting a sample of the radio frequency information signal, a radio frequency regenerator and an output circuit for regenerated radio frequency pulses. The regenerator reconstructs the remainder of the degraded input signal pulses, except the abstracted sample, as to both level and time relation to one another under the control of external timing pulses. The abstracted sample is demodulated in a detector. A timing wave generator is provided, the output of which is synchronized by the detector and has a repetition rate equal to the maximum pulse repetition rate which the degraded signal would have if all possible pulses were present therein. The timing wave generator output and the demodulated sample of signal energy abstracted from the signal path are applied to a logic circuit which applies the timing pulses to the radio frequency regenerator only when a timing pulse and a demodulated sample signal pulse are coincident. Consequently, external timing pulses are applied to the radio frequency regenerator only when there are signal pulses to be regenerated.

Radio frequency regenerators are especially improved with the circuit arrangement of the invention. The logic circuit referred to, which operates at baseband (or stated another way in the frequency range of the information pulse repetition rate), has the effect of lending its properties to, and thereby enhancing the properties of, the regenerator, which operates at some higher radio frequency.

Figure 2:
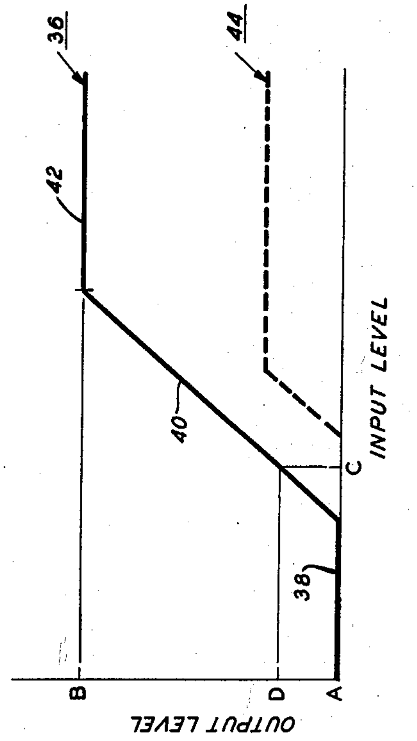

The above and other features of the invention will be considered in detail in the following specification taken in conjunction with the drawing, wherein:

FIG. 1 is a schematic diagram in block form of a repeater utilizing the present invention; and FIG. 2 is a graph of output level versus input level of a typical pulse regenerator.

For a detailed explanation of the present invention, a self-timed regenerative repeater of radio frequency pulse code signals is utilized. As pointed out above, the features of the present invention are particularly well adapted for use in radio frequency repeater systems because satisfactory properties are not as easily attainable in regenerators which regenerate radio frequency pulses, as they are in the regenerators which regenerate baseband pulses.

As shown in the repeater of FIG. 1, the incoming signal comprises radio frequency pulse code modulated signal 10, characterized by a radio frequency signal whose envelope varies according to the pulse code information being transmitted. This signal is intercepted by an antenna 12 and applied to a radio frequency signal path, shown in FIG. 1 as a heavy line. A radio frequency amplifier 14, preferably provided with automatic gain control to maintain its output at a constant signal level, amplifies the signal, after which a portion of the signal is abstracted from the signal path by means of a multibranch coupler 28. The remaining radio frequency signal is then filtered by a band-pass filter 16 to prepare it for regeneration. A regenerator 18 passes the radio frequency energy only when timing pulses are applied coincident with the signal pulses. If a timing pulse is applied to regenerator 18, and simultaneously therewith a radio frequency signal pulse above a predetermined level is applied, the radio frequency pulse is translated through regenerator 18. If these two conditions are not met simultaneously, no radio frequency energy will be translated through regenerator 18. While any regenerator meeting the above requirements may be employed, the regenerator disclosed in United States Patent 2,868,965, issued January 13, 1959, to O. E. De Lange, can be employed to great advantage in the circuit of FIG. 1.

The regenerated radio frequency pulses are filtered in preparation for transmission in a band-pass filter 20, and are then amplified in a radio frequency amplifier 22. An antenna 24 radiates the regenerated signal 26 into the transmission medium.

The source of timing pulses for regenerator 18 may now be considered. The energy abstracted from the main signal path by multibranch coupler 28 is detected in envelope detector 30. A portion of the detected output is applied to a timing wave generator 32 which develops, in accordance with well-known principles, a signal suitable for use in controlling regenerator 18. However, rather than applying the timing wave generator output directly to regenerator 18, as indicated by the prior art, it is instead, according to the invention, applied to one input of an AND circuit 34, to the other input of which is directly applied a portion of the output of detector 30. The output of AND circuit 34 supplies timing pulses to regenerator 18 to control the regeneration therein. Consequently, no timing pulses are applied to regenerator 18 unless there are gating signals of sufficient level applied to AND circuit 34 from the output of detector 30. This feature obviates the regeneration of a great deal of spurious signals and noise, and improves the shape of the regenerated pulses.

In FIG. 2, a graph of output level plotted against input level, a curve 36 delineates the properties of a typical pulse regenerator, such as regenerator 18 is presumed to be. Curve 36 can be broken up into three distinct regions. In a region 38, for any input level the output is some predetermined level, herein shown to be zero. The output level rises with increasing input level in a region 40. It should be understood that region 40 is shown idealized and most probably would not be a straight line function. Finally, in a region 42, for any input level the output is some constant larger predetermined level. Region 40 is an undesirable portion of curve 36 because it permits the regenerator output to assume levels other than the two predetermined levels, resulting in defective regeneration.

To illustrate the manner in which the external logic circuit (shown in FIG. 1 as AND circuit 34) improves the properties of regenerator 18, assume that it is desired to regenerate information pulses at a level B and spaces at a level A, here shown to be zero. In this instance any regeneration at levels other than A or B is unwanted. If the circuit configuration known in the prior art, in accordance with which the output of timing wave generator 32 would be applied directly to regenerator 18, is employed, the properties of regenerator 18 are properly represented by curve 36.

Undesired noise or a spurious signal at an input level C, for instance, applied to the input of the regenerator 18 produces an undesired signal at an output level of D. This result is extremely objectionable in regenerators.

If, now, AND circuit 34 (best advantage is taken of the invention if the properties of AND circuit 34 are appreciably better than those of regenerator 18) is connected, as shown in FIG. 1, and has properties represented by curve 44, a gating pulse at an input level C which is applied to AND circuit 34 from detector 30 is of insufficient level to allow a timing pulse to be applied to regenerator 18. The undesired noise or spurious signal at an input level of C in this instance produces the desired result of a regenerator output level of A, because there is no timing pulse applied to regenerator 18 coincident with the undesired noise or spurious signal applied thereto. Hence, this circuit arrangement precludes the regeneration of a great deal of noise and spurious signal which would, in the prior art arrangement, be regenerated.

An over-all effect of the external circuits of the invention is to enhance the apparent properties of regenerator 18, i.e., to reduce the varying region of the graph of the effective output level plotted against input level.

What is claimed is:

A pulse repeater system comprising a source of pulses which comprise the modulation envelope of a carrier wave of radio frequency energy in which the periodic frequency of said envelope constitutes the baseband frequency and means for regenerating said pulses, comprising detecting means connected to said source and utilizing a portion of said radio frequency energy for detecting said modulation envelope, means synchronized by said detected envelope for generating a timing wave at said baseband frequency, first logic means connected to said generating means and to said detecting means for transmitting said timing wave when receiving an input exceeding a first minimum level from said detecting means and blocking said timing wave when receiving an input less than said first minimum level from said detecting means, and second logic means connected to said first logic means and to said source of said pulses and utilizing the remainder of said radio frequency energy for amplifying and transmitting the portion of said remainder of said radio frequency energy exceeding a second minimum level when said first logic means transmits said timing wave, said second logic means blocking any portion of said remainder of said radio frequency energy when said first logic means blocks said timing wave and blocking any portion of said remainder of said radio frequency energy which is less than said second minimum level.

References Cited in the file of this patent

UNITED STATES PATENTS

| | | |
|---|---|---|
| 2,658,997 | Carbrey et al. | Nov. 10, 1953 |
| 2,953,641 | Carver | Sept. 20, 1960 |
| 2,981,796 | De Lange | Apr. 25, 1961 |